US010107974B2

(12) United States Patent
Hao et al.

(10) Patent No.: US 10,107,974 B2
(45) Date of Patent: Oct. 23, 2018

(54) QUARTZ PLASTIC COMPOSITE OPTICAL FIBER ASSEMBLY, RECOGNITION METHOD AND DEVICE

(71) Applicant: ZTE CORPORATION, Guangdong (CN)

(72) Inventors: Xiangyong Hao, Guangdong (CN); Aiping Ma, Guangdong (CN); Dezhi Zhang, Guangdong (CN); Yu Gong, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 15/520,571

(22) PCT Filed: Jun. 8, 2015

(86) PCT No.: PCT/CN2015/081005
§ 371 (c)(1),
(2) Date: Apr. 20, 2017

(87) PCT Pub. No.: WO2016/062096
PCT Pub. Date: Apr. 28, 2016

(65) Prior Publication Data
US 2017/0315302 A1  Nov. 2, 2017

(30) Foreign Application Priority Data

Oct. 20, 2014 (CN) .......................... 2014 1 0560273

(51) Int. Cl.
*G02B 6/44* (2006.01)
*G02B 6/38* (2006.01)
*F21V 8/00* (2006.01)

(52) U.S. Cl.
CPC ............ *G02B 6/3895* (2013.01); *G02B 6/001* (2013.01); *G02B 6/447* (2013.01); *G02B 6/3807* (2013.01)

(58) Field of Classification Search
None
See application file for complete search history.

(56) References Cited

U.S. PATENT DOCUMENTS 5,305,405 A * 4/1994 Emmons .............. G02B 6/2817
385/100
5,353,367 A * 10/1994 Czosnowski ........ G02B 6/4452
385/134

(Continued)

FOREIGN PATENT DOCUMENTS

CN  101995612 A  3/2011
CN  102033267 A  4/2011

(Continued)

OTHER PUBLICATIONS

International Search Report dated Sep. 14, 2015 issued in PCT/CN2015/081005.

(Continued)

*Primary Examiner* — Mike Stahl
(74) *Attorney, Agent, or Firm* — Scully, Scott, Murphy & Presser, P.C.

(57) ABSTRACT

A composite optical fiber assembly of quartz and plastic, an identification method and an identification device are disclosed. The composite optical fiber assembly of quartz and plastic includes a quartz optical fiber, a connector of the quartz optical fiber, at least two plastic optical fibers, and connectors of plastic optical fibers respectively corresponding to the at least two plastic optical fibers. The plastic optical fibers are laid on the quartz optical fiber. With the structure, whether the connectors at the two ends are prop- (Continued)

erly connected can be intuitively inspected by eyes and displayed.

4 Claims, 3 Drawing Sheets

(56) References Cited

U.S. PATENT DOCUMENTS

| | | | | |
|---|---|---|---|---|
| 5,394,503 | A * | 2/1995 | Dietz, Jr. | G02B 6/3817 |
| | | | | 385/134 |
| 5,463,706 | A * | 10/1995 | Dumont | G02B 6/3897 |
| | | | | 385/127 |
| 6,347,172 | B1 | 2/2002 | Keller et al. | |
| 7,561,060 | B2 * | 7/2009 | Duffy, III | H01B 7/32 |
| | | | | 340/691.1 |
| 8,267,706 | B2 * | 9/2012 | Patel | H01R 13/703 |
| | | | | 439/188 |
| 8,368,533 | B1 * | 2/2013 | Kelly | G02B 6/4471 |
| | | | | 340/10.1 |
| 8,965,200 | B2 * | 2/2015 | Wen | G02B 6/3895 |
| | | | | 356/73.1 |
| 9,304,278 | B1 * | 4/2016 | Bauco | G02B 6/447 |
| 2003/0152344 | A1 * | 8/2003 | Brunet | G02B 6/4415 |
| | | | | 385/100 |
| 2004/0071410 | A1 * | 4/2004 | Ma | H01R 13/6641 |
| | | | | 385/88 |
| 2011/0034068 | A1 * | 2/2011 | Russell | G02B 6/3895 |
| | | | | 439/488 |
| 2011/0221601 | A1 * | 9/2011 | Aguren | G02B 6/3895 |
| | | | | 340/653 |
| 2013/0209045 | A1 | 8/2013 | Dean, Jr. et al. | |
| 2015/0004832 | A1 * | 1/2015 | Homan | H01R 13/717 |
| | | | | 439/490 |
| 2017/0299791 | A1 * | 10/2017 | Hao | G02B 6/001 |

FOREIGN PATENT DOCUMENTS

| | | |
|---|---|---|
| CN | 102590956 A | 7/2012 |
| CN | 202771082 U | 3/2013 |
| CN | 203224651 U | 10/2013 |
| EP | 1 168 025 A2 | 6/2001 |
| EP | 2 312 355 A1 | 10/2010 |
| WO | WO 2005/106899 A1 * | 11/2005 |
| WO | WO 2006/044177 A2 | 4/2006 |

OTHER PUBLICATIONS

Supplementary European Search Report dated Oct. 27, 2017, issued in European Application No. 201410560273.1.

* cited by examiner

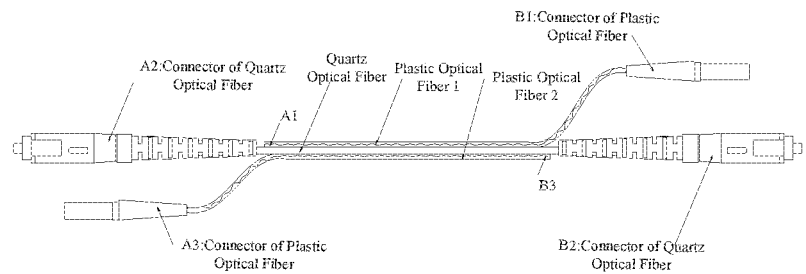

Fig. 1

```
┌─────────────────────────────────────────────────────────────┐
│ Determining whether the connector of the quartz optical fiber disposed │ ─── S202
│       with the plastic optical fiber is properly connected           │
└─────────────────────────────────────────────────────────────┘
                              │
                              ▼
┌─────────────────────────────────────────────────────────────┐
│ Lightening, depending on the result of the determination, the plastic │
│ optical fiber on the quartz optical fiber of which the connector has been │ ─── S204
│   properly connected, such that the plastic optical fiber conspicuously │
│ highlights a connection state of the connector of the quartz optical fiber │
└─────────────────────────────────────────────────────────────┘
```

Fig. 2

```
┌──────────────────┐
│  Determination   │
│    Module 32     │
├──────────────────┤
│ Lightening Module│
│        34        │
└──────────────────┘
```

Fig. 3

```
┌──────────────────┐
│  Determination   │
│    Module 32     │
├──────────────────┤
│    Lightening    │
│    Module 34     │
│ ┌──────────────┐ │
│ │Display Unit 42│ │
│ └──────────────┘ │
└──────────────────┘
```

Fig. 4

QUARTZ PLASTIC COMPOSITE OPTICAL FIBER ASSEMBLY, RECOGNITION METHOD AND DEVICE

CROSS-REFERENCE TO RELATED APPLICATIONS

This application is the 371 application of PCT Application No. PCT/CN2015/081005 filed Jun. 8, 2015, which is based upon and claims priority to Chinese Patent Application No. 201410560273.1, filed Oct. 20, 2014, the entire contents of which are incorporated herein by reference.

TECHNICAL FIELD

The present disclosure generally relates to the technical field of communication, and more particularly, to a composite optical fiber assembly of quartz and plastic, an identification method and an identification device.

BACKGROUND

In the field of large-capacity optical wiring, it requires quick and accurate location of two ends of an optical jumper wire. In addition to that, if reliable connection of connectors at the two ends can be intuitively identified, it will reduce the difficulty of maintenance and improve the construction efficiency and accuracy.

Currently, the commonly used identification methods are as follows:

Option 1: A label printed/pasted/tied on a cable is utilized. In this option, the label is easy to be scattered, lost and with fuzzy writing, and the labels have to be checked one by one to find the target end. Due to the above reasons, it suffers defects such as low search efficiency and frequent mistakes.

Option 2: two ends of a cable assembly are lightened with Light Emitting Diodes, to facilitate location of the two ends of the cable. In this option, the type of the cable has limitation since it has to be a cable has a metal-reinforced or similar structure that provides a metal conduction loop for the diodes. Therefore, it has a limited application range.

Option 3: two ends of a jumper wire are identified by lightening a plastic optical fiber. In this option, the identification method is intuitive, high effective and accurate. However, whether the connectors at the two ends are reliably connected cannot be intuitively identified.

Option 4: a quartz optical fiber and a plurality of plastic optical fibers are integrated into a connector of an optical fiber jumper wire, the quartz optical fiber handling transmission of operation and the plastic optical fibers handling transmission of identification signals by transmitting identification information.

In summary, with the first option to the third option, only two ends of the optical jumper wire can be intuitively identified, but whether the connectors at the two ends are reliably connected cannot be visually identified. With the fourth option, whether the connectors at the two ends are reliably connected cannot be intuitively inspected by eyes and displayed.

Currently, no effective solution has been proposed to address the problem that whether the connectors at the two ends are properly connected cannot be intuitively inspected by eyes and displayed in the related art.

This section provides background information related to the present disclosure which is not necessarily prior art.

SUMMARY

Embodiments of the present disclosure provides a composite optical fiber assembly of quartz and plastic, an identification method and an identification device, to at least solve the problem in the related art that whether the connectors at the two ends are properly connected cannot be intuitively inspected by eyes and displayed.

According to an aspect of the present disclosure, there is provided a composite optical fiber assembly of quartz and plastic, including: a quartz optical fiber, a connector of the quartz optical fiber, at least two plastic optical fibers, and connectors of plastic optical fibers respectively corresponding to the at least two plastic optical fibers, wherein the plastic optical fibers are laid on the quartz optical fiber.

In an embodiment of the present disclosure, each of the at least two plastic optical fibers is configured to conspicuously highlight the various connection states of the connector of the quartz optical fiber when a light source is introduced into the connector of the plastic optical fiber.

According to another aspect of the present disclosure, there is provided an identifying method, including: determining whether the connector of the quartz optical fiber disposed with the plastic optical fiber is properly connected; and depending on the result of the determination, lightening the plastic optical fiber on the quartz optical fiber of which the connector has been properly connected, such that the plastic optical fiber conspicuously highlights a connection state of the connector of the quartz optical fiber.

In an embodiment of the present disclosure, lightening the plastic optical fiber on the quartz optical fiber of which the connector has been properly connected, such that the plastic optical fiber conspicuously highlights a connection state of the connector of the quartz optical fiber, includes: introducing a light source into the connector of the plastic optical fiber, and conspicuously highlighting the connection state of the connector of the quartz optical fiber by a part or the whole of the plastic optical fiber.

In an embodiment of the present disclosure, depending on the result of the determination, lightening the plastic optical fiber on the quartz optical fiber of which the connector has been properly connected, includes: when the result of the determination is positive, introducing a green light source into the connector of the plastic optical fiber, such that the plastic optical fiber conspicuously highlights that the connector of the quartz optical fiber has been properly connected; or when the result of the determination is negative, introducing a red light source into the connector of the plastic optical fiber, such that the plastic optical fiber conspicuously highlights that the connector of the quartz optical fiber has been improperly connected.

According to another aspect of the present disclosure, there is provided an identification device, including: a determination module configured to determine whether the connector of the quartz optical fiber disposed with the plastic optical fiber is properly connected; and a lightening module configured to, depending on the result of the determination, lighten the plastic optical fiber on the quartz optical fiber of which the connector has been properly connected, such that the plastic optical fibers conspicuously highlights a connection state of the connector of the quartz optical fiber.

In an embodiment of the present disclosure, the lightening module includes: a display unit configured to, when a light source is introduced into the connector of the plastic optical fiber, conspicuously highlight the connection state of the connector of the quartz optical fiber by a part or the whole of the plastic optical fiber.

In an embodiment of the present disclosure, the lightening module further includes: a first introduction unit configured to, when the determination result is positive, introduce a green light source into the connector of the plastic optical fiber, such that the plastic optical fiber conspicuously highlights that the connector of the quartz optical fiber has been properly connected; or, a second introduction unit configured to, when the determination result is negative, introduce a red light source into the connector of the plastic optical fiber, such that the plastic optical fiber conspicuously highlights that the connector of the quartz optical fiber has been improperly connected.

According to another aspect of the present disclosure, there is provided a composite optical fiber assembly of quartz and plastic, at least including the above device.

Through the embodiments of the present disclosure, by utilizing a composite optical fiber assembly of quartz and plastic, including: a quartz optical fiber, a connector of the quartz optical fiber, two plastic optical fibers, and connectors of plastic optical fibers respectively corresponding to the at least two plastic optical fibers, wherein the plastic optical fibers are laid on the quartz optical fiber, it can solve the problem in the related art that whether the connectors at the two ends are properly connected cannot be intuitively inspected by eyes and displayed. It can achieve an effect that whether the connectors at the two ends are properly connected can be intuitively inspected by eyes and displayed.

This section provides a summary of various implementations or examples of the technology described in the disclosure, and is not a comprehensive disclosure of the full scope or all features of the disclosed technology.

BRIEF DESCRIPTION OF THE DRAWINGS

The drawings described herein are provided to provide a further understanding of the present disclosure, which form a part of this application, and the illustrative embodiments of the present disclosure and its description are intended to be illustrative of the present disclosure and are not to be construed as limiting the present disclosure. In the drawings:

FIG. 1 is a schematic diagram illustrating a composite optical fiber assembly of quartz and plastic according to an embodiment of the present disclosure;

FIG. 2 is a flowchart illustrating a method for identifying a composite optical fiber according to an embodiment of the present disclosure;

FIG. 3 is a block diagram illustrating a device for identifying a composite optical fiber according to an embodiment of the present disclosure;

FIG. 4 is a first block diagram illustrating a device for identifying a composite optical fiber according to a preferable embodiment of the present disclosure;

DETAILED DESCRIPTION

Figure 5:
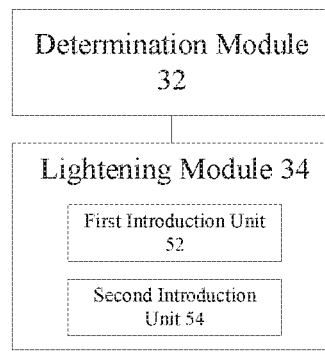
FIG. 5 is a second block diagram illustrating a device for identifying a composite optical fiber according to a preferable embodiment of the present disclosure.

Hereinafter, the present disclosure will be described in detail with reference to the accompanying drawings and in conjunction with embodiments. It is to be noted that the features in the embodiments and examples of the present application may be combined with each other without conflict.

An embodiment of the present disclosure provides a composite optical fiber assembly of quartz and plastic, briefly referred to as composite optical fiber. FIG. 1 is a schematic diagram illustrating a composite optical fiber assembly of quartz and plastic according to an embodiment of the present disclosure, including: a quartz optical fiber, a connector of the quartz optical fiber, two plastic optical fibers, and connectors of plastic optical fibers respectively corresponding to the at least two plastic optical fibers, wherein the plastic optical fiber is laid on the quartz optical fiber, as shown in FIG. 1.

In the embodiment of the present disclosure, each of the at least two plastic optical fibers is configured to conspicuously highlight the various connection states of the connector of the quartz optical fiber when a light source is introduced into the connector of the plastic optical fiber.

An embodiment of the present disclosure also provides an identification method. FIG. 2 is a flowchart illustrating a method for identifying a composite optical fiber according to an embodiment of the present disclosure. As shown in FIG. 2, the method includes the following steps.

At step S202, it is determined whether the connector of the quartz optical fiber disposed with the plastic optical fiber is properly connected.

At step S204, depending on the result of the determination, it is lightened the plastic optical fiber on the quartz optical fiber of which the connector has been properly connected, such that the plastic optical fiber conspicuously highlights a connection state of the connector of the quartz optical fiber.

Through the above steps, it is determined whether the connector of the quartz optical fiber disposed with the plastic optical fiber is properly connected, and depending on the result of the determination, it is lightened the plastic optical fiber of the quartz optical fiber of which the connector has been properly connected, such that the plastic optical fiber conspicuously highlights a connection state of the connector of the quartz optical fiber. It can solve the problem in the related art that whether the connectors at the two ends are properly connected cannot be intuitively inspected by eyes and displayed. It can achieve an effect that whether the connectors at the two ends are properly connected can be intuitively inspected by eyes and displayed.

In the embodiment of the present disclosure, lightening the plastic optical fiber on the quartz optical fiber of which the connector has been properly connected, such that the plastic optical fiber conspicuously highlights a connection state of the connector of the quartz optical fiber, includes: a light source is introduced into the connector of the plastic optical fiber, and the connection state of the connector of the quartz optical fiber is conspicuously highlighted by a part or the whole of the plastic optical fiber. For example, coating may be removed from an end section or any middle section of the plastic optical fiber to conspicuously expose the lightened plastic optical fiber, such that the user can intuitively see it.

As an preferable implementation, when the connector of the quartz optical fiber is properly connected, a green light source is introduced into the connector of the plastic optical fiber, such that the plastic optical fiber conspicuously highlights that the connector of the quartz optical fiber has been properly connected; and/or, when the connector of the quartz optical fiber is improperly connected, a red light source is introduced into the connector of the plastic optical fiber, such that the plastic optical fiber conspicuously highlights that the connector of the quartz optical fiber has been improperly connected. Thus, the user can intuitively determine the connection states of the connector of the quartz optical fiber based on the colors and the user experience can be improved.

An embodiment of the present disclosure provides an identification device. The device is configured to implement the above embodiments and preferable implementation. Similar description thereof will be omitted. As used herein, the term "module" can be implemented as combination of software and/or hardware which have predetermined functions. Although the devices described in the following embodiments are preferably implemented in software, the implementation of hardware, or a combination of software and hardware, is also possible and envisioned.

FIG. 3 is a block diagram illustrating a device for identifying a composite optical fiber according to an embodiment of the present disclosure. As shown in FIG. 3, the device includes:

a determination module 32 configured to determine whether the connector of the quartz optical fiber disposed with the plastic optical fiber is properly connected; and a lightening module 34 configured to, depending on the result of the determination, lighten the plastic optical fiber on the quartz optical fiber of which the connector has been properly connected, such that the plastic optical fiber conspicuously highlights a connection state of the connector of the quartz optical fiber.

FIG. 4 is a first block diagram illustrating a device for identifying a composite optical fiber according to a preferable embodiment of the present disclosure. As shown in FIG. 4, the above lightening module 34 includes:

a display unit 42 configured to, when a light source is introduced into the connector of the plastic optical fiber, conspicuously highlight the connection state of the connector of the quartz optical fiber by a part or the whole of the plastic optical fiber.

FIG. 5 is a second block diagram illustrating a device for identifying a composite optical fiber according to a preferable embodiment of the present disclosure. As shown in FIG. 5, the above lightening module 34 further includes:

a first introduction unit 52 configured to, when the determination result is positive, introduce a green light source into the connector of the plastic optical fiber, such that the plastic optical fiber conspicuously highlights that the connector of the quartz optical fiber has been properly connected; and/or, a second introduction unit 54 configured to, when the determination result is negative, introduce a red light source into the connector of the plastic optical fiber, such that the plastic optical fiber conspicuously highlights that the connector of the quartz optical fiber has been improperly connected.

An embodiment of the present disclosure also provides a composite optical fiber assembly of quartz and plastic, including at least one of the above devices.

The embodiments of the present disclosure will be further explained in conjunction with preferable implementations.

An embodiment of the present disclosure provides an identification method for a cable that may be lightened at both ends, which can be used to identify two ends of a jumper wire and identify whether the two ends are reliably connected or not intuitively by eyes and with high efficiency.

The embodiment of the present disclosure includes a quartz optical fiber and a connector of the quartz optical fiber, a plastic optical fiber 1 and a connector of the plastic optical fiber 1, a plastic optical fiber 2 and a connector of the plastic optical fiber 2. The plastic optical fibers and the quartz optical fiber are assembled to an "A" shaped cable or a circle-shaped cable, to meet the requirements of both of operation transmission and identification information transmission, and to ensure adequate tensile strength and other physical conditions.

The cable that may be lightened at both ends is tied or laid on an object to be identified. By lightening the cable, the object to be identified can be displayed conspicuously. Thus, the other end of the jumper wire can be intuitively and quickly located and identified. After the two ends are reliably connected, the reliable connection state of the two ends can be intuitively signified by lightening the two plastic indicative optical fibers. Further, with a background network control, different colors of light sources are introduced into the two plastic optical fibers to deliver particular information. For example, after an end A2 is reliably connected, a plastic optical fiber B3 and a plastic optical fiber A1 have their coating removed sections displayed with green visible lights; after B2 is reliably connected, the plastic optical fiber A1 and a plastic optical fiber B1 have their coating removed sections displayed with green visible lights. With the B1 and B3, A1 and A3 plastic optical fibers all have their coating removed sections displayed with green visible lights at the same time, it may be read as a consistent handshaking signal which identifies that both of the two ends have been properly connected into a reliable state, achieving a purpose of intuitive and highly efficiently identification. If one end is not reliably connected or has error, the connector of the plastic optical fiber corresponding to that end will not be introduced with green visible light, or may be introduced with red light to indication improper connection. Here, The colors and states of the visible light to be lightened require support from hardware and background control software.

The cable that may be lightened at both ends according to the embodiment of the present disclosure, i.e. the above composite optical fiber assembly of quartz and plastic, includes three parts: a quartz optical fiber and a connector of the quartz optical fiber, configured to transmit operation, as shown by the reference A2~B2 in FIG. 1; a plastic optical fiber 1 and a connector of the plastic optical fiber, configured to be lightened to identify the other end of the quartz optical fiber and the plastic optical fiber, to achieve a function of searching for searching an optical fiber, and to send a handshaking signal together with a plastic optical fiber 2 to intuitively identifying whether the two ends have been connected reliably with visible lights; and the plastic optical fiber 2 and a connector of the plastic optical fiber, configured to be lightened to identify the other end of the quartz optical fiber and the plastic optical fiber, to achieve a function of searching for an optical fiber, and to send a handshaking signal together with the plastic optical fiber 1 to intuitively identifying whether the two ends have been connected reliably with visible lights.

Figure 6:
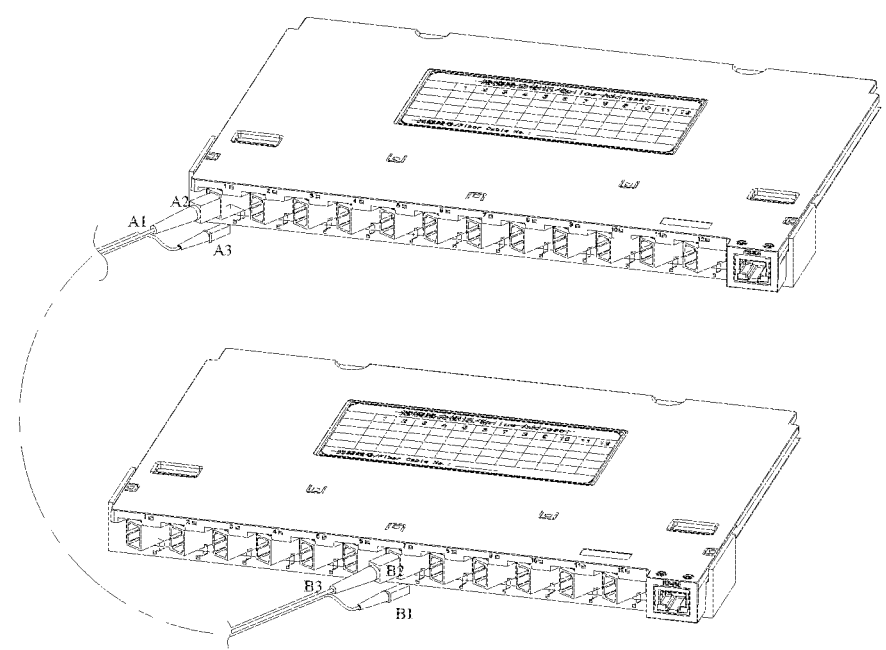
FIG. 6 is a schematic diagram illustrating a connection structure of a cable that may be lightened at both ends according to an embodiment of the present disclosure.

FIG. 6 is a schematic diagram illustrating a connection structure of a cable that may be lightened at both ends according to an embodiment of the present disclosure. As shown in FIG. 6, in an intelligent ODN wiring scene where the two ends have a large distance, high-efficient, intuitive and accurate wiring can be ensured. Through the background network management, panel LED lights which are indicative of maintenance and construction are lightened, indicating that the two ends are in a maintenance state. Herein, for easy description, the two ends are referred to as A2 and B2, and respectively correspond to the ends A2 and B2 of the optical jumper wire as shown in FIGS. 1, and A1 and B3 respectively refers to light source interfaces A1 and B3 of the plastic optical fiber. The end A2 is inserted and connected to A2, and A3 is inserted and connected to A1.

The background reads the label information and reports it to the network manager, and determines whether the quartz optical fiber A2 is connected reliably. If the connection is reliable, the panel LED light corresponding to A2 is extinguished, indicating that the quartz optical fiber has been reliably connected. If the LED light is not extinguished, indicating that the quartz optical fiber has not been reliably connected. In this case, the end is pulled out and wiped and connected again, till the LED light is extinguished, indicating that the quartz optical fiber has been reliably connected. If the LED is extinguished, the light source at A1 is activated, for example, to display a green visible light. If the green visible light is not displayed, it means that the connector of the plastic optical fiber is not reliably connected, and the connector of the plastic optical fiber should be pulled out and connected again, till the green visible light is displayed. In this case, to analyze the reason for the invisible green light, another external light source can be aligned with the connector of the plastic optical fiber, or a certain length of the tail section of the connector of the plastic optical fiber A3 can have its coating layer removed to expose the visible light. These means can be employed to exclude the fact that the end A3 of the plastic optical fiber has failure. If a certain length of a section of the plastic optical fiber at the end B1 with its coating layer removed displays green light, it conspicuously indicates the other end B2 of the optical jumper wire (i.e. the quartz optical fiber) and the end B3 of the plastic optical fiber 2. The optical jumper wire at the opposite ends B2 and B3 found in the step 5 are respectively connected to B2 and B3. The background reads the label information and reports it to the network manager, and determines whether the quartz optical fiber B2 is connected reliably. If the connection is reliable, the panel LED light corresponding to B2 is extinguished, indicating that the quartz optical fiber has been reliably connected. If the LED light is not extinguished, indicating that the quartz optical fiber has not been reliably connected. In this case, the end is pulled out and wiped and connected again, till the LED light is extinguished, indicating that the quartz optical fiber has been reliably connected. If the LED is extinguished, the light source at B3 is activated, for example, to display a green visible light. If the green visible light is not displayed, it means that the connector of the plastic optical fiber is not reliably connected, and the connector of the plastic optical fiber should be pulled out and connected again, till the green visible light is displayed. In this case, to analyze the reason for the invisible green light, another external light source can be aligned with the connector of the plastic optical fiber, or a certain length of the tail section of the connector of the plastic optical fiber B3 can have its coating layer removed to expose the visible light. These means can be employed to exclude the fact that the end B3 of the plastic optical fiber has failure. If a certain length of a section of the plastic optical fiber at the end A1 with its coating layer removed and a certain length of a section of the plastic optical fiber at the end B1 with its coating layer removed display the same visible light, it indicates that the both of the two end have been reliably connected, that is the construction is completed. In the drawings, a SC optical connector is used only for illustration, the application can be expanded to any other connector or any other physical structure that needs to be identified. Any identification method that has some or all of the applied features may be defined as in the scope protected by the embodiments of the present disclosure.

Figure 7:
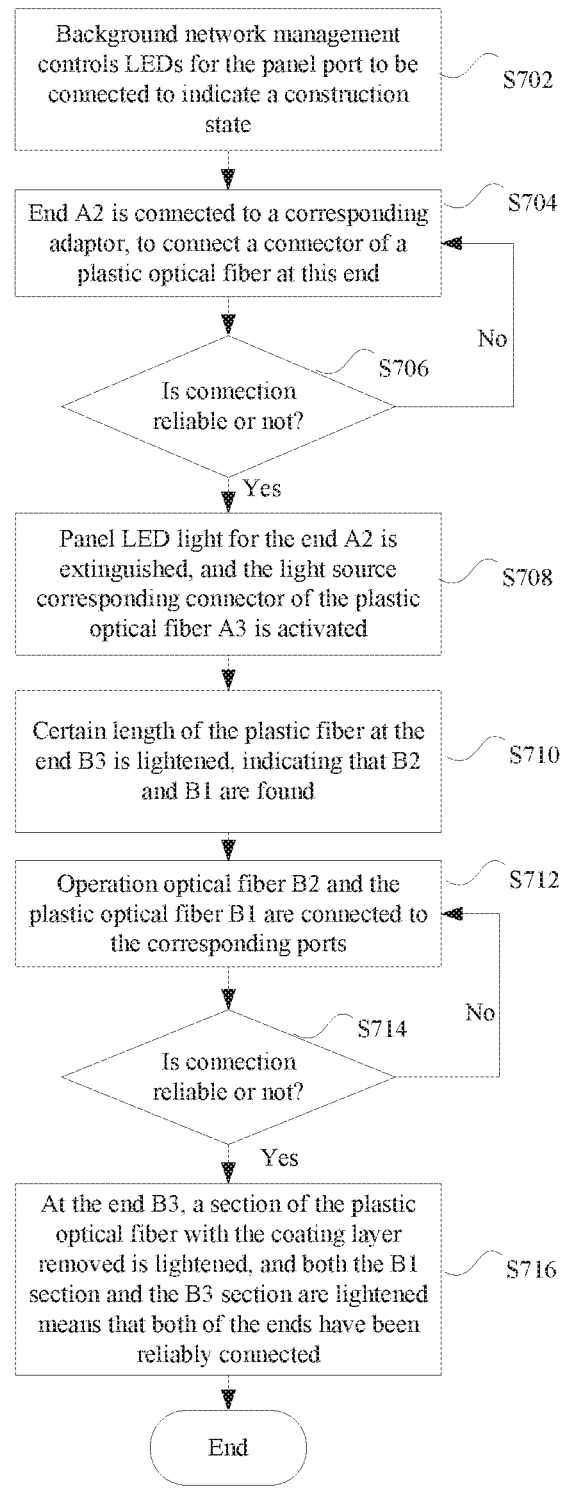
FIG. 7 is a flowchart illustrating a process for identifying a composite optical fiber according to an embodiment of the present disclosure.

FIG. 7 is a flowchart illustrating a process for identifying a composite optical fiber according to an embodiment of the present disclosure. As shown in FIG. 7, the process includes the following steps.

At step S702, the background network management controls LEDs for the panel port to be connected to indicate a construction state.

At step S704, the end A2 is connected to a corresponding adaptor, to connect a connector of a plastic optical fiber at this end.

At step S706, the background reads label information of A2, and determines whether the connection is reliable or not. If the determination result is YES, the process goes to perform step S708, otherwise goes to perform step S704.

At step S708, the panel LED light for the end A2 is extinguished, and the light source corresponding connector of the plastic optical fiber A3 is activated.

At step S710, a certain length of the plastic fiber at the end B3 is lightened, indicating that B2 and B1 are found.

At step S712, the operation optical fiber B2 and the plastic optical fiber B1 are connected to the corresponding ports.

At step S714, the background reads the label information at B2 and determines whether the connection is reliable or not. If the determination result is YES, the process goes to perform step S716, otherwise to perform step S712.

At step S716, at the end B3, a section of the plastic optical fiber with the coating layer removed is lightened, and both the B1 section and the B3 section are lightened means that both of the ends have been reliably connected.

Through the above steps, not only the target jumper wire can be easily identified, but also it can intuitively determine whether the identified jumper wire has both ends properly and reliable connected.

It will be apparent to those skilled in the art that the foregoing modules or steps of embodiments of the present disclosure may be implemented by a general purpose computing device which may be focused on a single computing device or distributed over a network composed of a plurality of computing devices. Alternatively, they may be implemented by program codes executable by the computing device, so that they may be stored in a storage device and executed by the computing device. In some cases, they may be implemented in a different order than that of the steps illustrated and described herein. Alternatively, they may be separately made into individual integrated circuit modules, or a plurality of modules or steps in them are made into a single integrated circuit module. Thus, the present disclosure is not limited to any particular combination of hardware and software.

The foregoing is merely illustrative of the preferred embodiments of the present disclosure and is not intended to be limiting of the present disclosure. Various changes and modifications may be made by those skilled in the art. Any modifications, equivalent substitutions, improvements, and the like within the spirit and principles of the present disclosure are intended to be included within the scope of the present disclosure.

What is claimed is:

1. A method for identifying connection state of a composite optical fiber assembly, the optical fiber assembly comprising: a quartz optical fiber, a connector of the quartz optical fiber, at least two plastic optical fibers, and connectors of plastic optical fibers respectively corresponding to the at least two plastic optical fibers, wherein each of the at least two plastic optical fibers are laid on the quartz optical fiber, wherein the method comprises:

determining whether the connector of the quartz optical fiber is properly connected; and depending on the result of the determination, lightening one of the at least two plastic optical fibers on the quartz optical fiber of which the connector has been properly connected, enabling the one of the at least two plastic optical fibers to conspicuously highlight a connection state of the connector of the quartz optical fiber.

2. The method of claim 1, wherein lightening one of the at least two plastic optical fibers on the quartz optical fiber of which the connector has been properly connected comprises:

introducing a light source into the connector of the one of the at least two plastic optical fibers, and conspicuously highlighting the connection state of the connector of the quartz optical fiber by a part or the whole of the one of the at least two plastic optical fibers.

3. The method of claim 1, wherein depending on the result of the determination, lightening one of the at least two plastic optical fibers on the quartz optical fiber of which the connector has been properly connected, comprises:

when the result of the determination is positive, introducing a green light source into the connector of the one of the at least two plastic optical fibers, such that the one of the at least two plastic optical fibers conspicuously highlights that the connector of the quartz optical fiber has been properly connected.

4. The method of claim 1, further comprising:

when the result of the determination is negative, introducing a red light source into the connector of one of the at least two plastic optical fibers, such that the one of the at least two plastic optical fibers conspicuously highlights that the connector of the quartz optical fiber has been improperly connected.

\* \* \* \* \*